US011292046B2

(12) United States Patent
Sakamoto et al.

(10) Patent No.: US 11,292,046 B2
(45) Date of Patent: Apr. 5, 2022

(54) METHOD FOR MANUFACTURING PRESS MOLDED PRODUCT

(71) Applicant: KOBE STEEL, LTD., Hyogo (JP)

(72) Inventors: Kazuki Sakamoto, Kobe (JP); Yasuhiro Hayashida, Kobe (JP); Kenichi Watanabe, Kobe (JP); Takayuki Kimura, Kobe (JP)

(73) Assignee: Kobe Steel, Ltd., Hyogo (JP)

( * ) Notice: Subject to any disclaimer, the term of this patent is extended or adjusted under 35 U.S.C. 154(b) by 240 days.

(21) Appl. No.: 16/626,103

(22) PCT Filed: May 29, 2018

(86) PCT No.: PCT/JP2018/020551
§ 371 (c)(1),
(2) Date: Dec. 23, 2019

(87) PCT Pub. No.: WO2019/003766
PCT Pub. Date: Jan. 3, 2019

(65) Prior Publication Data
US 2020/0206798 A1    Jul. 2, 2020

(30) Foreign Application Priority Data

Jun. 28, 2017 (JP) .............................. JP2017-126524

(51) Int. Cl.
*B21D 22/26* (2006.01)
*B21D 22/24* (2006.01)
(Continued)

(52) U.S. Cl.
CPC ............. *B21D 22/26* (2013.01); *B21D 22/24* (2013.01); *B21D 24/00* (2013.01); *B21D 37/10* (2013.01); *B21D 53/88* (2013.01); *B62D 25/04* (2013.01)

(58) Field of Classification Search
CPC ........ B21D 13/02; B21D 22/20; B21D 22/21; B21D 22/22; B21D 22/24; B21D 22/26;
(Continued)

(56) References Cited

U.S. PATENT DOCUMENTS 4,503,702 A * 3/1985 Bulso, Jr. ............ B21D 51/2646
72/348
8,250,896 B2 * 8/2012 Hirotani ................. B21D 22/22
72/350

(Continued)

FOREIGN PATENT DOCUMENTS

| CN | 105339104 A | 2/2016 |
| JP | 2011-161941 A | 8/2011 |
| JP | 2017-131960 A | 8/2017 |

OTHER PUBLICATIONS

Notification of Transmittal of Translation of the International Preliminary Report on Patentability and Translation of Written Opinion of the International Searching Authority; PCT/JP2018/020551; dated Jan. 9, 2020.

*Primary Examiner* — Edward T Tolan
(74) *Attorney, Agent, or Firm* — Studebaker & Brackett PC

(57) ABSTRACT

A method for manufacturing a press molded product includes forming a plurality of corner portions in a pressed portion of a pressed member, providing the pressed member between a first die and a second die, and press molding the pressed portion to decrease a height of the pressed portion. The press molding includes forming a pair of first bent portions in the pressed portion by means of the corner portions, the pair of first bent portions being bent to protrude toward the second die, forming a second bent portion in the pressed portion by means of the corner portions while holding the pair of first bent portions by a pair of holding portions, the second bent portion being bent to protrude (Continued)

toward the first die from a position between the pair of first bent portions, and pressing and deforming the second bent portion.

5 Claims, 13 Drawing Sheets

(51) Int. Cl.
*B21D 24/00* (2006.01)
*B21D 37/10* (2006.01)
*B21D 53/88* (2006.01)
*B62D 25/04* (2006.01)

(58) Field of Classification Search
CPC ........ B21D 22/30; B21D 22/02; B21D 22/06; B21D 24/00; B21D 24/04; B21D 24/06; B21D 37/10
See application file for complete search history.

(56) References Cited

U.S. PATENT DOCUMENTS

| | | | |
|---|---|---|---|
| 8,402,804 B2* | 3/2013 | Nakao | B21D 22/06 |
| | | | 72/347 |
| 10,300,519 B2* | 5/2019 | Sakamoto | B21J 5/08 |
| 2010/0018280 A1* | 1/2010 | Maeda | B21D 22/26 |
| | | | 72/358 |
| 2010/0251796 A1* | 10/2010 | Akimoto | H02K 15/0421 |
| | | | 72/375 |
| 2015/0217354 A1* | 8/2015 | Iwanuma | B21D 22/208 |
| | | | 72/309 |
| 2016/0129491 A1 | 5/2016 | Taguchi et al. | |
| 2016/0332205 A1* | 11/2016 | Nakazawa | B21D 22/26 |
| 2017/0216901 A1 | 8/2017 | Sakamoto et al. | |
| 2017/0326612 A1* | 11/2017 | Alpen | B21D 24/10 |
| 2019/0176204 A1* | 6/2019 | Suzuki | B21D 5/01 |

* cited by examiner

METHOD FOR MANUFACTURING PRESS MOLDED PRODUCT

CROSS-REFERENCE TO RELATED APPLICATIONS

This is a national phase application in the United States of International Patent application No. PCT/JP2018/020551 with an international filing date of May 29, 2018, which claims priority of Japanese Patent Application No. 2017-126524 filed on Jun. 28, 2017. The contents of the application are incorporated herein by reference.

TECHNICAL FIELD

The present invention relates to a method for manufacturing a press molded product.

BACKGROUND ART

Conventionally, a technique for manufacturing an automobile frame member by press molding a metal plate has been known. There has been an increasing demand for such a technique, for the automobile frame member, not only to manufacture a metal plate with a uniform thickness, but also to manufacture a metal plate formed with a partially thickened portion to be reinforced. JP 2011-161941 A discloses a technique for manufacturing a frame member thus partially thickened by press molding a metal plate.

JP 2011-161941 A discloses a method for manufacturing an automobile pillar, the method including: preparing a flat plate member having a wavy microbead including continuous recessed and protruding portions; and pressing the member. According to this method, the microbead is pressed in a thickness direction so that the plate thickness is increased, whereby a partially thickened pillar can be manufactured.

SUMMARY OF THE INVENTION

Problems to be Solved by the Invention

In the method for manufacturing a pillar disclosed in JP 2011-161941 A, first, a flat plate member is bent so that microbeads are formed in advance, and the microbeads are pressed so that the thickened portion is formed. In this case, the material is stretched in the bending for forming the microbeads before the pressing. This causes distortion resulting in thinning of the plate material. As a result, even if the microbeads are pressed in the subsequent step, the desired thickened amount cannot be achieved. Furthermore, heavily local thinning may occur to result in a starting point of cracks in the press molded product. As described above, the technique disclosed in JP 2011-161941 A may fail to appropriately obtain a desired shape.

In view of this, an object of the present invention is to provide a method for manufacturing a press molded product, enabling a desired shape to be more appropriately obtained.

Solutions to the Problems

A first aspect of the present invention is directed to a method for manufacturing a press molded product by press molding a pressed portion that has a bent shape and is formed in a pressed member having a plate shape, the method comprising:

forming a plurality of corner portions in the pressed portion;

providing the pressed member, having the corner portions formed in the pressed portion, between a first die and a second die; and press molding the pressed portion by relatively moving the first die and the second die toward each other to decrease a height of the pressed portion, in which the press molding includes forming a pair of first bent portions in the pressed portion by means of the corner portions, the pair of first bent portion being bent to protrude toward the second die, forming a second bent portion in the pressed portion by means of the corner portions while holding the pair of first bent portions by a pair of holding portions that has a groove shape and is provided to be spaced apart from each other in the second die, the second bent portion being bent to protrude toward the first die from a position between the pair of first bent portions, and pressing and deforming the second bent portion.

According to the above configuration, during the press molding of the pressed portion, the second bent portion is pressed while the first bent portions are being held in the holding portions of the second die. This can make a material flow entirely over the pressed portion during the press molding, whereby local thinning that may result in a starting point of cracks in the press molded product can be prevented. Thus, a press molded product having a desired shape can be appropriately obtained. With the corner portions formed in the pressed portion and the first and the second bent portions formed by means of the corner portions, material flow is facilitated so that the first and second bent portions can be easily formed at desired positions, whereby the press molded product with a desired shape can be more appropriately obtained.

The aspect preferably further includes the following configurations.

(1) In the press molding step, the pressed portion is thickened.

According to the configuration (1), a press molded product in which the strength of the pressed portion is improved can be manufactured.

(2) In the press molding, the pressed portion is press molded so that the height of the pressed portion disappears after the molding.

According to the configuration (2), a press molded product in which the strength of the pressed portion is further improved can be manufactured.

(3) In the press molding, the pressed portion is press molded so that the pressed portion after being molded has a bent shape with a smaller height than the pressed portion before being molded.

According to the configuration (3), a press molded product having a bent shape can be manufactured. Here, the term "bent shape" means any shape that is bent to bulge in a thickness direction of the plate material.

(4) In the press molding, peripheral portions of the pressed portion in the pressed member are clamped by the first die and the second die.

According to the configuration (4), flow of the material into the peripheral portions can be suppressed during the press molding.

(5) The pressed member is formed by hot pressing.

As described above, the flow of the material in the pressed portion during the press molding can be controlled. Thus, according to the configuration (5), a press molded product with a desired shape can be easily obtained even when the hot pressing facilitating the flow of the material is performed.

Effects of the Invention

According to the present invention, a method for manufacturing a press molded product, enabling a desired shape to be more appropriately obtained, can be provided.

EMBODIMENTS OF THE INVENTION

Hereinafter, embodiments of the present invention will be described in detail with reference to the drawings.

[Press Molding Apparatus]

Figure 1:
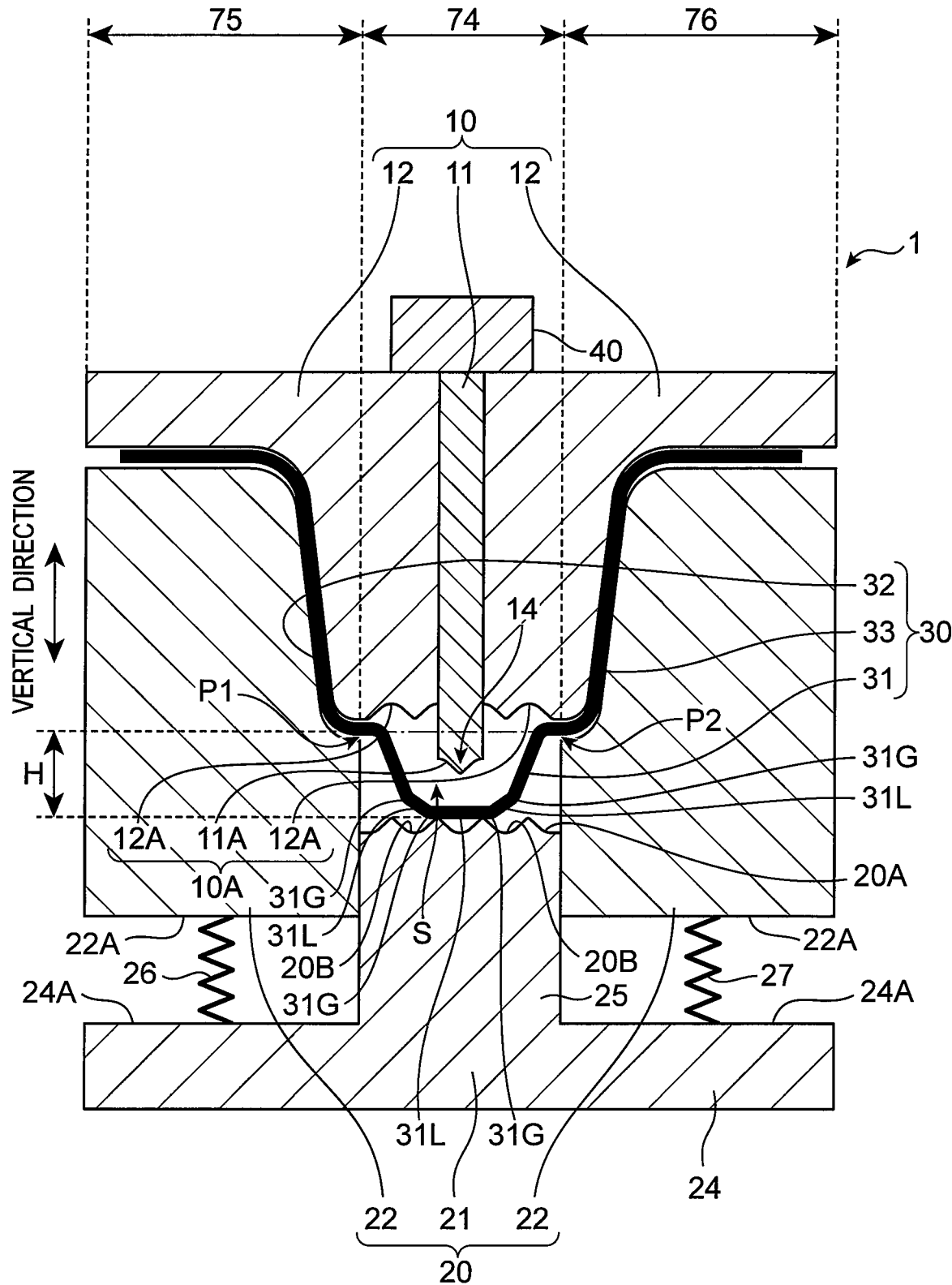
FIG. 1 is a diagram illustrating a press molding apparatus used in a method for manufacturing a press molded product according to an embodiment of the present invention.

FIG. 1 is a diagram illustrating a press molding apparatus used in a method for manufacturing a press molded product according to an embodiment of the present invention. As illustrated in FIG. 1, a press molding apparatus 1 is an apparatus for manufacturing a press molded product having a hat shape in a cross sectional view, by press molding a pressed portion 31, with a bent shape, formed in a pressed member 30 having a plate shape. Here, the term "pressed portion" refers to a portion of the pressed member to be deformed by pressing. The press molding apparatus 1 includes a first die 10 that is an upper mold, a second die 20 that is a lower mold, and a drive unit 40. Hereinafter, the vertical direction in FIG. 1 is simply referred to as "vertical direction". Note that the vertical direction is not necessarily the direction of gravity. The second die 20 faces the first die 10 in the vertical direction. The drive unit 40 moves the first die 10 in the vertical direction toward the second die 20 or away from the second die 20.

The pressed member 30 is a plate material made of a metal material such as hard steel, mild steel, aluminum, titanium, or copper. The pressed member 30 includes the pressed portion 31 and peripheral portions 32 and 33 that are connected to each other to be in a single plate shape. The pressed portion 31 is a portion to be thickened as a result of the press molding. The peripheral portions 32 and 33 are connected to both ends of the pressed portion 31, and are bent to have an L-shaped cross section. The peripheral portions 32 and 33 are portions that are not pressed by the first die 10 and the second die 20.

As illustrated in FIG. 1, the pressed portion 31 has a shape bent in a polygonal shape in a cross sectional view. More specifically, the pressed portion 31 has a height H in the vertical direction, and has a polygonal shape including a plurality of corner portions 31G and a plurality of linear portions 31L connecting the corner portions 31G to each other.

The pressed portion 31 before the pressing has a line length longer than the length along the undulations of an uneven area 91A, described later, in a press molded product 90 illustrated in FIG. 11. Here, the term "line length" of the pressed portion 31 is a length between one and the other end portions of the pressed portion 31 along the pressed portion 31. For this reason, by press molding the pressed portion 31 so that the uneven area 91A is formed (in other words, so that the height H of the trapezoid disappears), the line length of the pressed portion 31 is shortened, and the pressed portion 31 can be thickened accordingly.

Figure 2:
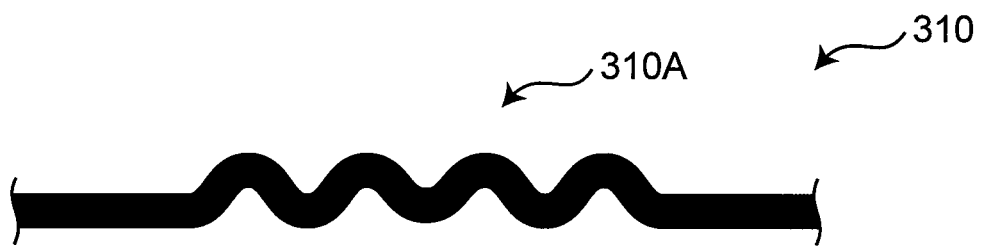
FIG. 2 is a view illustrating microbeads formed in a pressed portion.

The pressed portion 31 is configured to have a bent shape as described above, so that a sufficient line length required for the thickening is ensured. More specifically, a longer line length can be ensured, compared with a comparative example illustrated in FIG. 2 where microbeads 310A including a continuous uneven area are formed in the pressed portion 310 having a flat plate shape. Thus, in the present embodiment, the length (line length) between one and the other end portions of the pressed portion 31 along the pressed portion 31 can be largely increased as compared to the comparative example where the microbeads 310A are formed, whereby a larger thickening amount of the pressed portion 31 can be achieved.

Figure 6:
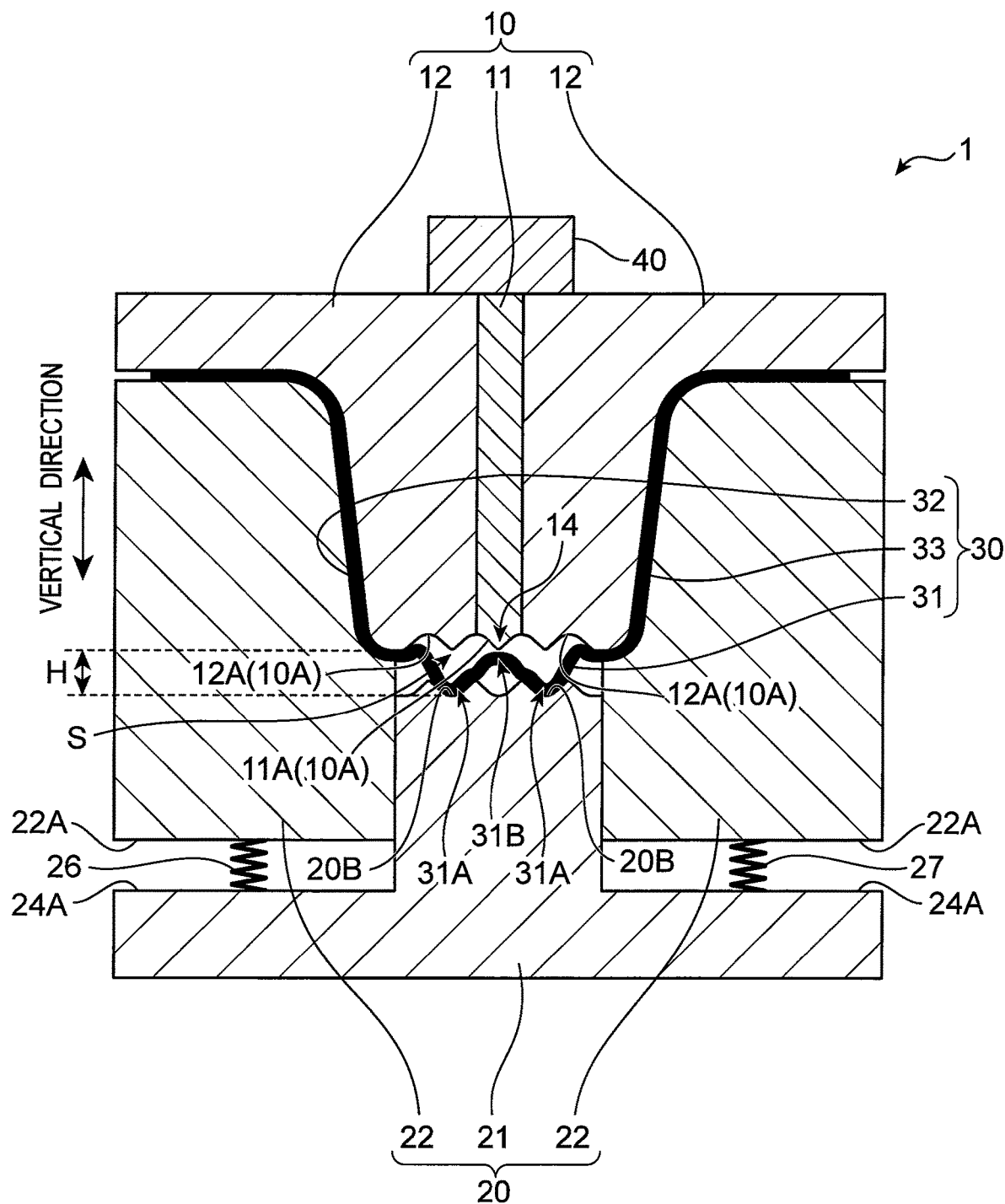
FIG. 6 is a diagram illustrating a state in which the second bent portion, formed in the pressed portion, is pressed by a pressing portion of a first die.

As illustrated in FIG. 1, the first die 10 has a wavy upper press molding surface 10A for pressing one main surface of the pressed portion 31. The first die 10 includes a first-die center portion 11 disposed at the center of the first die 10 and first-die peripheral portions 12 disposed on both sides of the first-die center portion 11. The upper press molding surface 10A includes a first molding surface 11A provided at the lower end of the first-die center portion 11 and second molding surfaces 12A provided at the lower ends of the first-die peripheral portions 12. Furthermore, as illustrated in FIG. 6, when the height of the first molding surface 11A matches the height of the second molding surfaces 12A, the upper press molding surface 10A is a surface having a continuous uneven area.

Furthermore, as illustrated in FIG. 1, the first die 10 including the upper press molding surface 10A includes an upper molding die portion 74 that is a portion for press molding the pressed portion 31, and upper clamping die portions 75 and 76 that clamp and fix the peripheral portions 32 and 33. The upper molding die portion 74 includes the first-die center portion 11 and the first-die peripheral portions 12 that are integrally formed, and the upper clamping die portions 75 and 76 are configured as a part of the first-die peripheral portions 12.

The first-die center portion 11 and the first-die peripheral portions 12 are configured to be movable, in the vertical direction, by the drive unit 40 independently of each other. Specifically, only the first-die peripheral portions 12 can be moved up and down with the position of the first-die center portion 11 fixed, and only the first-die center portion 11 can be moved in the vertical direction with the positions of the first-die peripheral portions 12 fixed.

Figure 5:
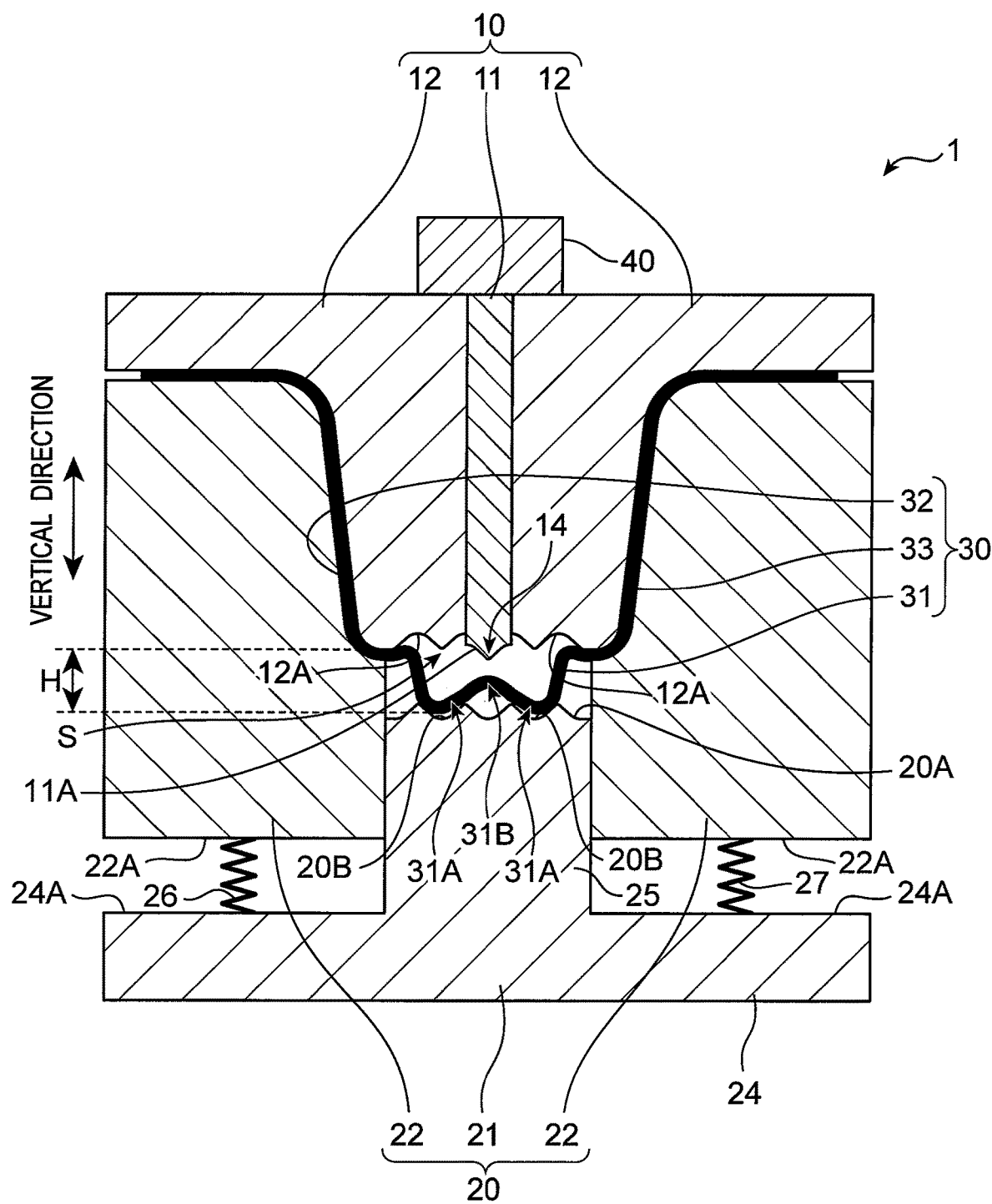
FIG. 5 is a diagram illustrating a state in which first and second bent portions are formed in a pressed portion of the pressed member.

The first molding surface 11A of the first-die center portion 11 is provided with a pressing portion 14 having a shape protruding downward toward the second die 20. The pressing portion 14 is a center portion of the first molding surface 11A and protrudes downward beyond the portions on both sides thereof. As illustrated in FIG. 5, during press molding, a second bent portion 31B is formed on the pressed portion 31. The second bent portion 31B is bent to protrude toward the first die 10, and can be pressed by the pressing portion 14.

As illustrated in FIG. 1, the second die 20 has a wavy lower press molding surface 20A that faces the upper press molding surface 10A of the first die 10. The second die 20 includes a second-die center portion 21 and second-die peripheral portions 22 formed separately from the second-die center portion 21.

Figure 8:
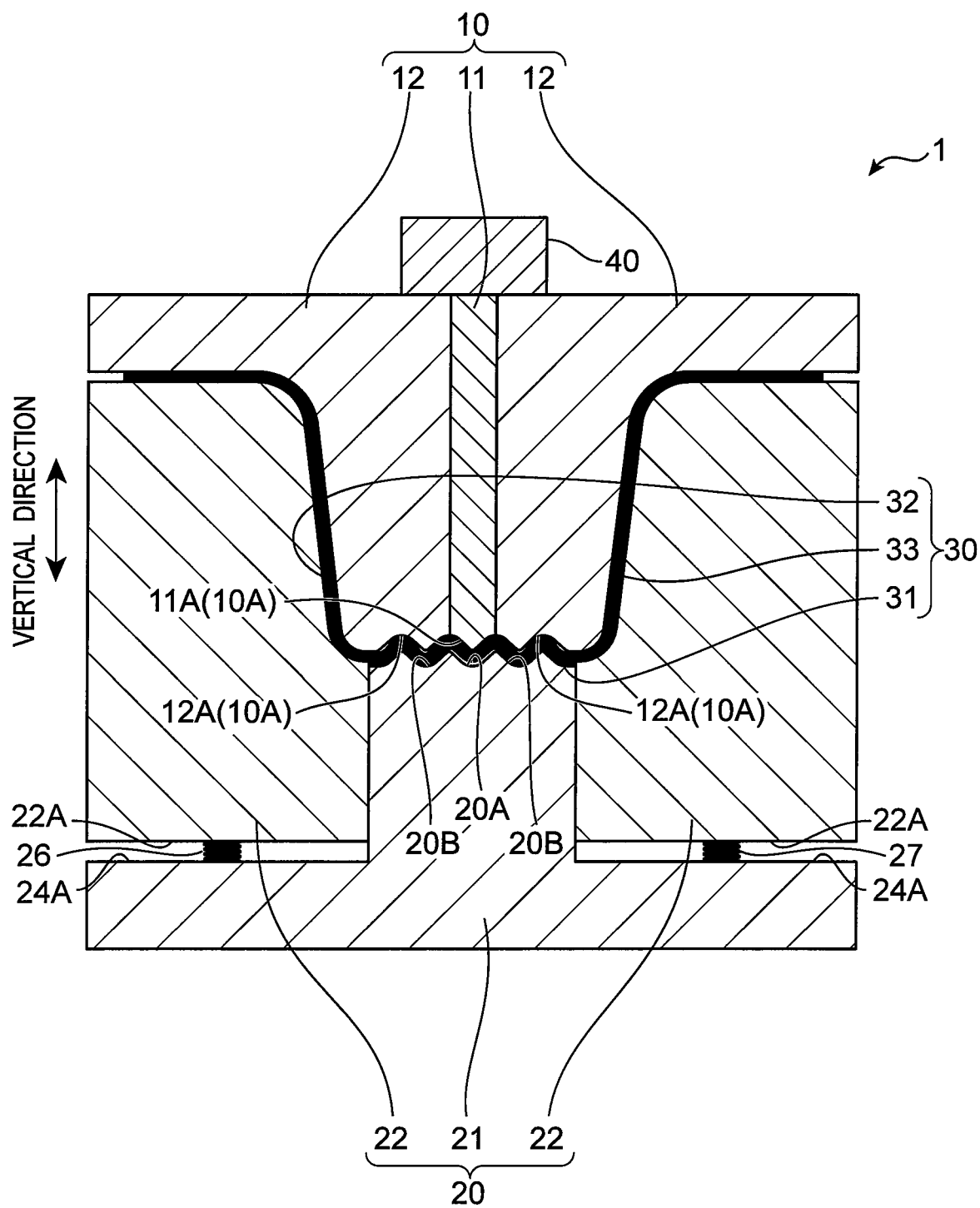
FIG. 8 is a diagram illustrating a state in which an uneven area is formed in the pressed portion.

The second-die center portion 21 includes a support portion 24 provided on a horizontal plane, and a molding portion 25 standing upward toward the first die 10, at substantially the center of the support portion 24. The lower press molding surface 20A is provided at the top of the molding portion 25. The lower press molding surface 20A is configured to include a continuous uneven area, as in the configuration of the upper press molding surface 10A, and has a length that is the same as the width of the uneven area 91A formed in the press molded product 90 illustrated in FIG. 11. Furthermore, protruding portions of the upper press molding surface 10A face recessed portions of the lower press molding surface 20A, and recessed portions of the upper press molding surface 10A face protruding portions of the lower press molding surface 20A. Thus, as illustrated in FIG. 8, by press molding the pressed portion 31 into a wavy shape with the upper press molding surface 10A and the lower press molding surface 20A, the uneven area conforming to the uneven surfaces of the upper and lower press molding surfaces 10A and 20A can be formed on the pressed portion 31.

As illustrated in FIG. 5, during the press molding, two first bent portions 31A are formed in the pressed portion 31. The first bent portions 31A are spaced apart from each other and are bent to protrude toward the second die 20. The two first bent portions 31A can be held by a pair of holding portions 20B, having concave groove shapes, provided in the lower press molding surface 20A. The pair of holding portions 20B is provided so as to be spaced apart from each other to sandwich a concave groove at the center of the lower press molding surface 20A, and is positioned on the outer side with respect to the pressing portion 14 of the first die 10. Thus, the pressing portion 14 is positioned between the two holding portions 20B.

As illustrated in FIG. 1, the second-die peripheral portions 22 are arranged to face the first-die peripheral portions 12 in the vertical direction, so that the peripheral portions 32 and 33 are clamped between the first-die peripheral portions 12 and the second-die peripheral portions 22. The second-die peripheral portions 22 have lower end surfaces 22A connected to one ends of elastic members 26 and 27 such as springs, to be connected to an upper surface 24A of the support portion 24 via the elastic members 26 and 27. In a state before the start of pressing illustrated in FIG. 1, the second-die peripheral portions 22 are located on the upper side with respect to the molding portion 25 of the second-die center portion 21 so that these portions form a step shape. Thus, a press space S in which the pressed portion 31 is accommodated is formed between the upper press molding surface 10A and the lower press molding surface 20A. Then, when the first-die peripheral portions 12 are lowered to downwardly press the second-die peripheral portions 22, the elastic members 26 and 27 are compressed, and the second-die peripheral portions 22 slide downward on side surfaces of the molding portion 25. As a result, the press space S is gradually reduced, and the pressed portion 31 is pressed.

In the second die 20, the second-die center portion 21 corresponds to a lower molding die portion that cooperates with the upper molding die portion 74 to press mold the pressed portion 31, and the second-die peripheral portions 22 correspond to lower clamping die portions that cooperate with the upper clamping die portions 75 and 76 to clamp and fix the peripheral portions 32 and 33. Thus, in this embodiment, the lower molding die portion and the lower clamping die portions are configured as separate portions.

The drive unit 40 is for lowering the first die 10 to approach the second die 20. Thus, the press space S can be reduced and the pressed portion 31 can be press molded. The drive unit 40 is disposed on the upper side of the first die 10 and has a hydraulic or electric piston capable of reciprocating movement. The first-die center portion 11 and the first-die peripheral portions 12 are pressed by this piston, and thus can be moved up and down independently of each other.

[Method for Manufacturing Press Molded Product]

Figure 3:
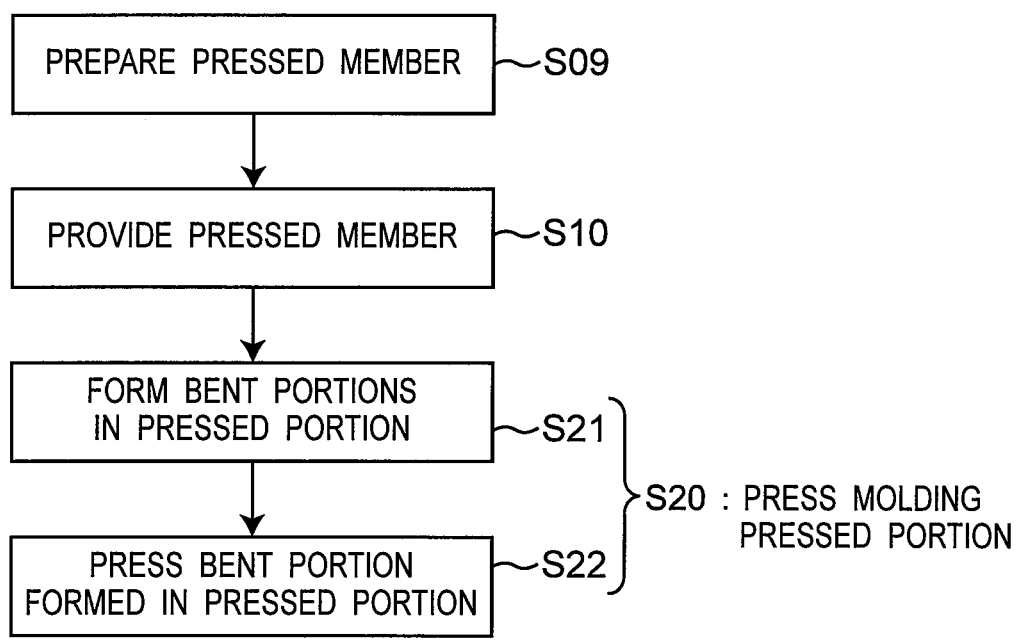
FIG. 3 is a flowchart illustrating a flow of the method for manufacturing the press molded product.

Next, a process for press molding the pressed portion 31 using the press molding apparatus 1 will be described mainly with reference to a flowchart in FIG. 3 and to FIGS. 1 and 4 to 9. FIGS. 1 and 4 to 9 sequentially illustrate processes of reducing the press space S and press molding the pressed portion 31 by lowering the first die 10 toward the second die 20. In the present embodiment, hot pressing for press molding the pressed member 30 softened by heating will be described. However, the present invention is not limited to this, and the present manufacturing method can be similarly used in cold forming.

First, step S09 for preparing the pressed member 30 is performed. In step S09, first of all, a flat plate-shaped pressed member 30 made of various metal materials such as hard steel is prepared, and by processing this, a bent pressed portion 31 having the plurality of corner portions 31G is formed. Then, the pressed member 30 is softened by being heated in an electric furnace or by being energized and heated.

Next, step S10 for providing the pressed member 30 in the press molding apparatus 1 is performed. In step S10, the pressed member 30 softened by being heated is disposed between the first die 10 and the second die 20. In this process, as illustrated in FIG. 1, the peripheral portions 32 and 33 are disposed between the first-die peripheral portions 12 and the second-die peripheral portions 22, and the pressed portion 31 is disposed in the press space S.

Figure 7:
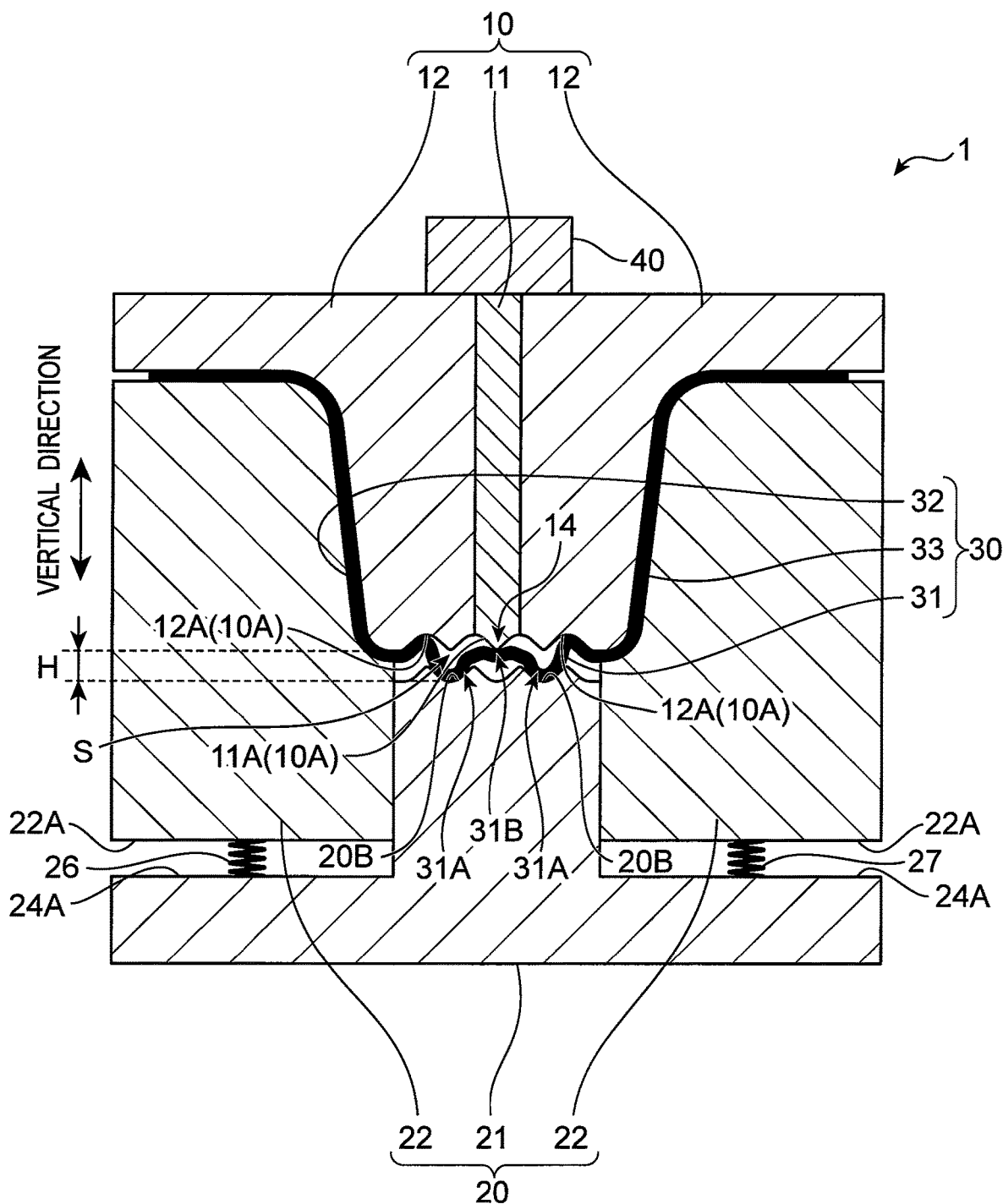
FIG. 7 is a diagram illustrating a state, subsequent to that in FIG. 6, in which the second bent portion, formed in the pressed portion, is pressed by the pressing portion of the first die.

Next, step S20 for press molding the pressed portion 31 is performed. In step S20, the press space S is reduced by bringing the first die 10 closer to the second die 20, so that the pressed portion 31 is press molded to have the height H decreased. In step S20, bending step S21 illustrated in FIG. 5 and deforming step S22 illustrated in FIGS. 6 and 7 are performed in that order. In bending step S21, the first bent portions 31A and the second bent portion 31B are formed in the pressed portion 31 by means of the corner portions 31G. In deforming step S22, the second bent portion 31B is pressed and deformed while the first bent portions 31A are being held by the holding portions 20B.

Figure 4:
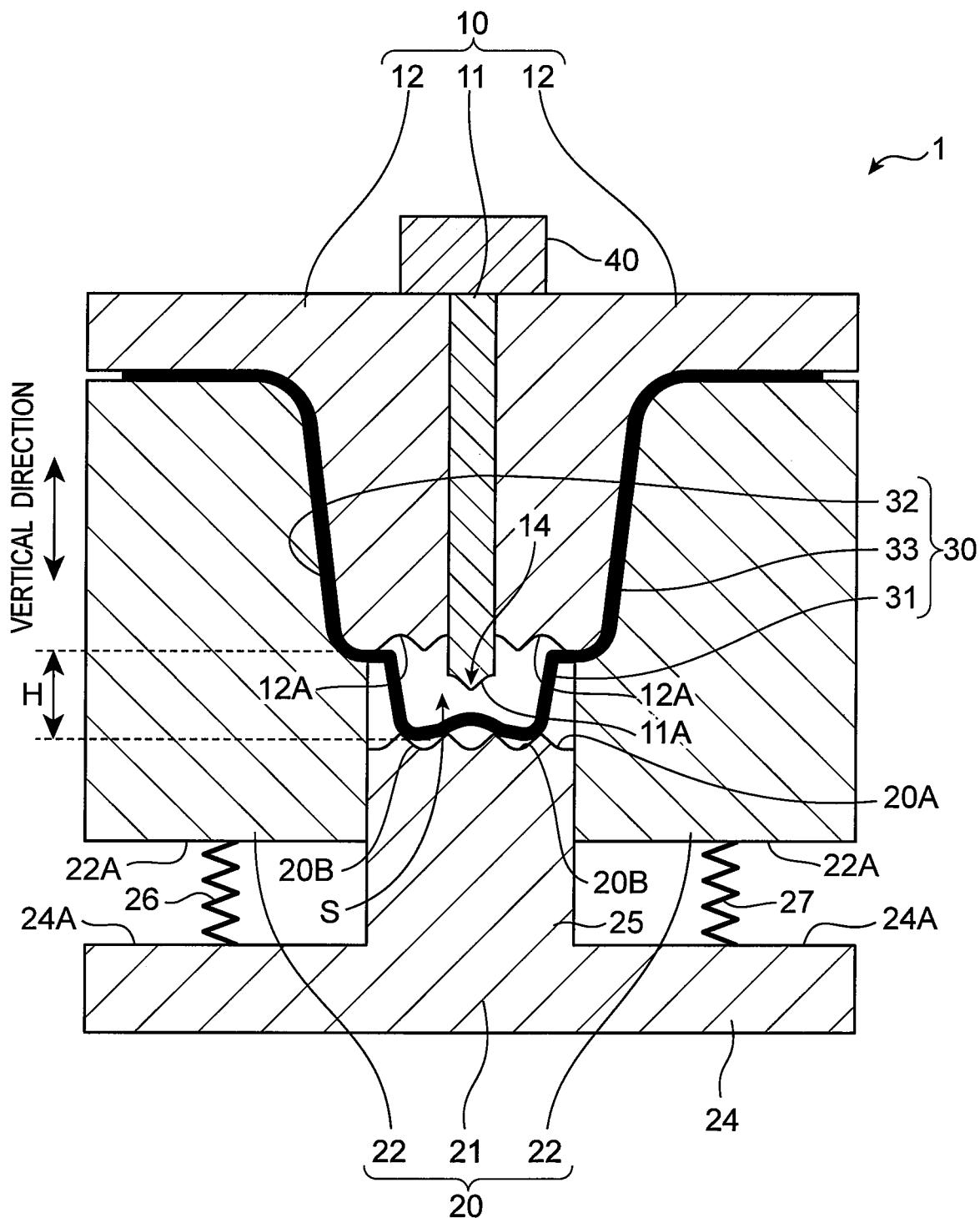
FIG. 4 is a diagram illustrating a state in which peripheral portions of a pressed member are clamped by molds.

First of all, in bending step S21, in the state illustrated in FIG. 1, the first-die peripheral portions 12 are lowered toward the second-die peripheral portions 22 by the drive unit 40 with the position of the first-die center portion 11 fixed. As a result, as illustrated in FIG. 4, the peripheral portions 32 and 33 are clamped and fixed between the first-die peripheral portions 12 and the second-die peripheral portions 22. Thus, the flow of the material toward the peripheral portions 32 and 33 is prevented.

By further lowering the first-die peripheral portions 12 in this state, the press space S is reduced, and the height H of the pressed portion 31 is gradually decreased. Then, when the height H of the pressed portion 31 decreases to or below a predetermined value, the pressed portion 31 is bent by means of the corner portions 31G, whereby the pair of first bent portions 31A that is bent to protrude toward the second die 20 and the second bent portion 31B that is bent to protrude toward the first die 10 from a position between the pair of first bent portions 31A are formed in the pressed portion 31 as illustrated in FIG. 5. The expression "formed by means of the corner portions 31G" may indicate that the presence of the corner portions 31G results in bending at the corner portions 31G and bending at a portion between the corner portions 31G. In this process, as the first die 10 approaches the second die 20 with the peripheral portions 32 and 33 fixed, the material between the holding portions 20B and the peripheral portions 32 and 33 flows toward the holding portions 20B, and further flows from the holding portions 20B toward the pressing portion 14. As a result, as illustrated in FIG. 5, the first bent portions 31A bulge to fit in the concave grooves of the holding portions 20B to have the position fixed, and the second bent portion 31B bulges upward to face the pressing portion 14 of the first die 10.

Figure 9:
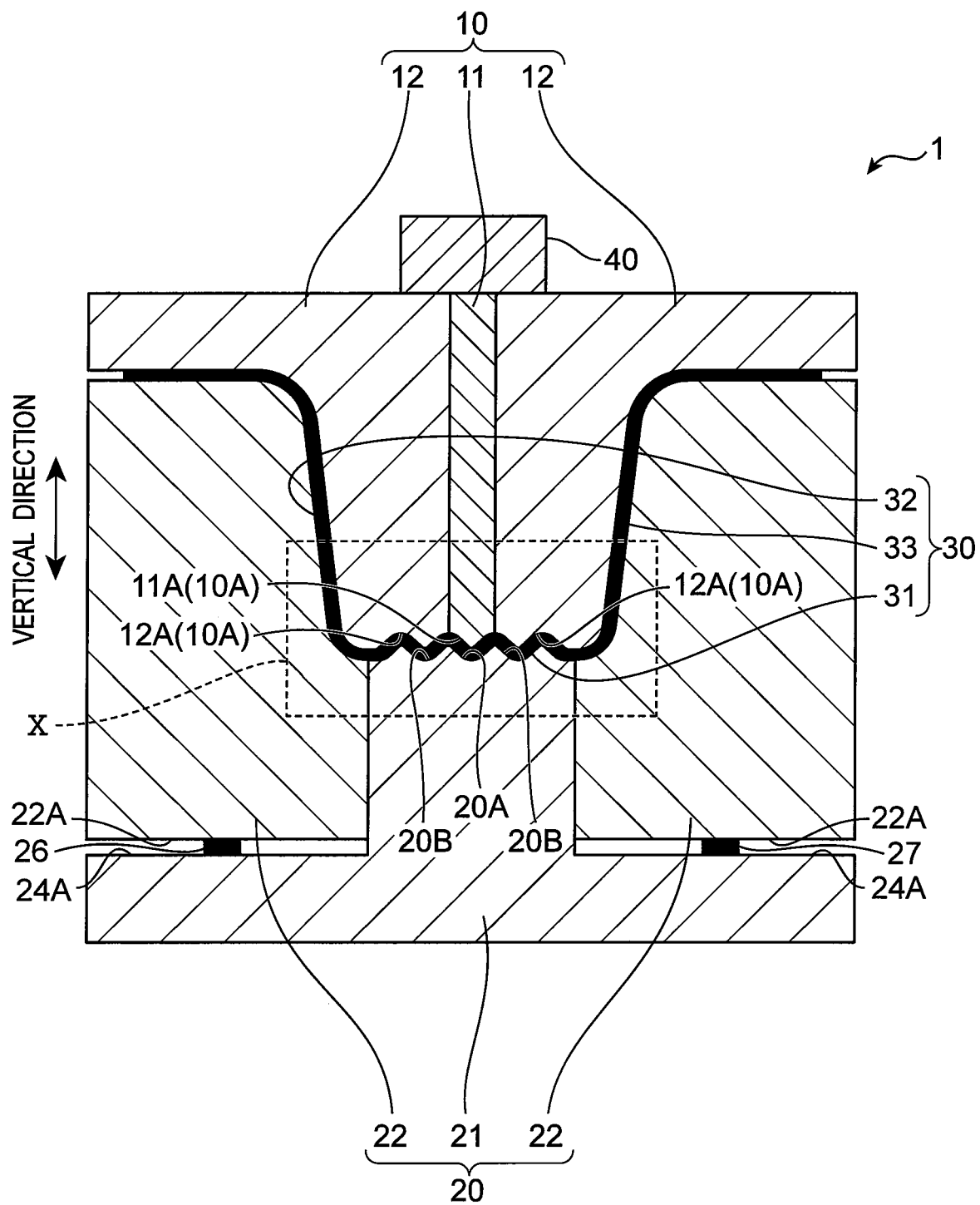
FIG. 9 is a diagram illustrating a state in which press molding for the pressed portion is completed.

Next, in deforming step S22, both the first-die center portion 11 and the first-die peripheral portions 12 are lowered by the drive unit 40, whereby the second bent portion 31B is pressed by the pressing portion 14 of the first die 10 while the first bent portions 31A are being held by the holding portions 20B as illustrated in FIGS. 6 and 7. As a result, the second bent portion 31B is deformed to be bent downward. In this process, the material flow in the pressed portion 31 occurs, but with the first bent portions 31A being held by the holding portions 20B, the outward flow of the material beyond the holding portions 20B (that is, toward the peripheral portions 32 and 33) is suppressed, whereby uneven distribution with an excessive amount of material being on both sides of the pressed portion 31 can be prevented. Furthermore, the end portions of the peripheral portions 32 and 33 connected to the pressed portion 31 are clamped between the first-die peripheral portions 12 and the second-die peripheral portions 22, whereby the material is also suppressed from flowing into the peripheral portions 32 and 33. Furthermore, in the center portion of the pressed portion 31, the second bent portion 31B is pressed by the pressing portion 14, thus uneven distribution due to the excessive amount of the material can be prevented. Then, as illustrated in FIGS. 8 and 9, the movement of the first-die center portion 11 and the first-die peripheral portions 12 is stopped once the pressed portion 31 is lowered to a point when the height H disappears and the press molding is completed. As illustrated in an enlarged view of FIG. 10, when the pressing is completed, a distance L1 between the pressing portion 14 and the portion of the second die 20 facing the pressing portion 14 (the bottom surface of the concave groove in the lower press molding surface 20A) is the same as a distance L2 between the bottom surface of the holding portion 20B and the portion of the first die 10 facing the holding portion 20B (the protruding portion in the upper press molding surface 10A).

Figure 10:
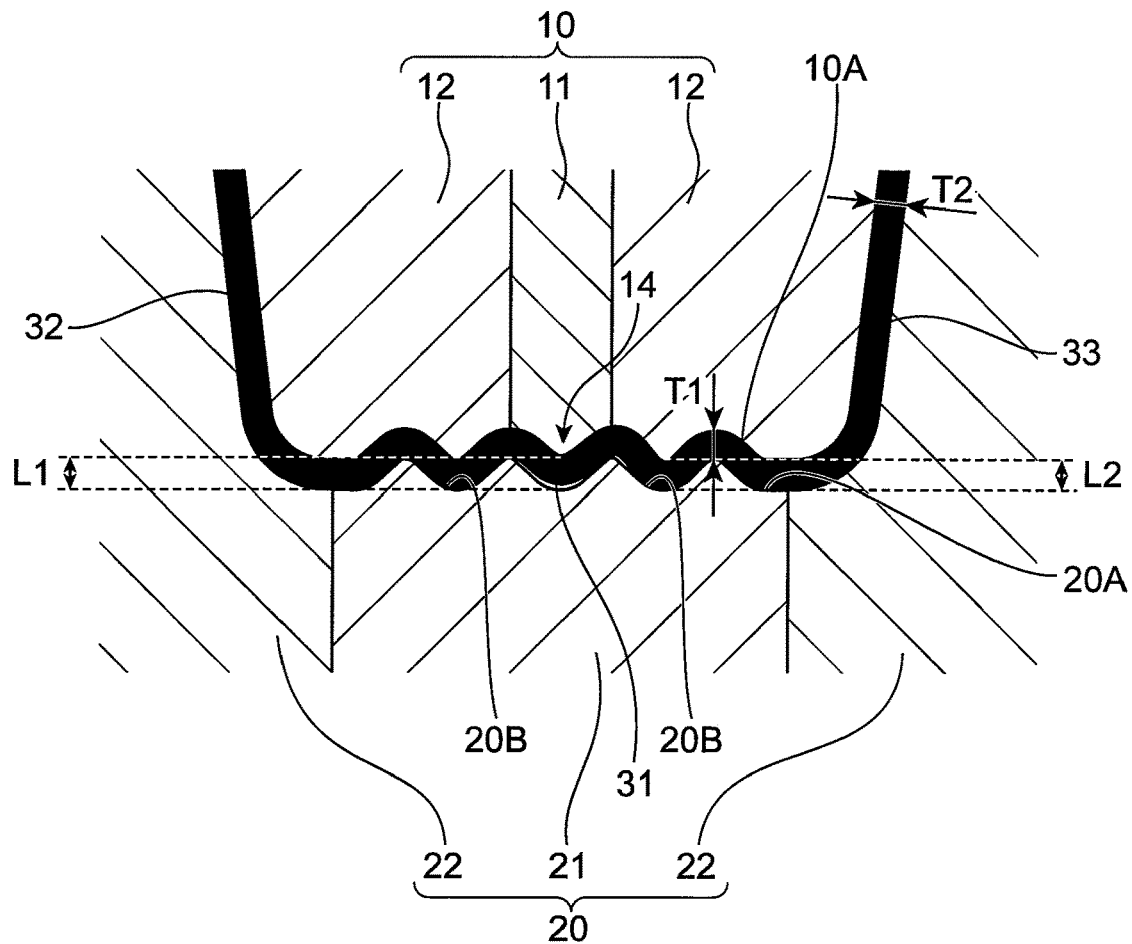
FIG. 10 is an enlarged view of a region X in FIG. 9.

As described above, by press molding the pressed portion 31 in the height direction (that is, in the vertical direction) while preventing the material from flowing toward the peripheral portions 32 and 33, the pressed portion 31 is thickened in accordance with the decrease in the height H of the pressed portion 31. Thus, as illustrated in FIG. 10, the pressed portion 31 has a thickness T1 larger than a thickness T2 of the peripheral portions 32 and 33 (the portions other than the pressed portion 31), whereby a press molded product that is partially thickened is manufactured. Here, the thicknesses T1 and T2 are the thicknesses (minimum thicknesses) of the thinnest portions of the pressed portion 31 and the peripheral portions 32 and 33, respectively. Furthermore, the pressed portion 31 after being molded is not only thickened, but also has the uneven area 91A having a shape conforming to the uneven surfaces of the upper and lower press molding surfaces 10A and 20A. When the press molding is thus completed, the first die 10 is raised by the drive unit 40, and then the press molded product is taken out.

[Press Molded Product]

Next, the press molded product 90 according to the present embodiment will be described with reference to FIG. 11. The press molded product 90 is a part used as an automobile frame member such as a front pillar, a cross member, and a side sill, and is manufactured by the method for manufacturing a press molded product according to the present embodiment.

Figure 11:
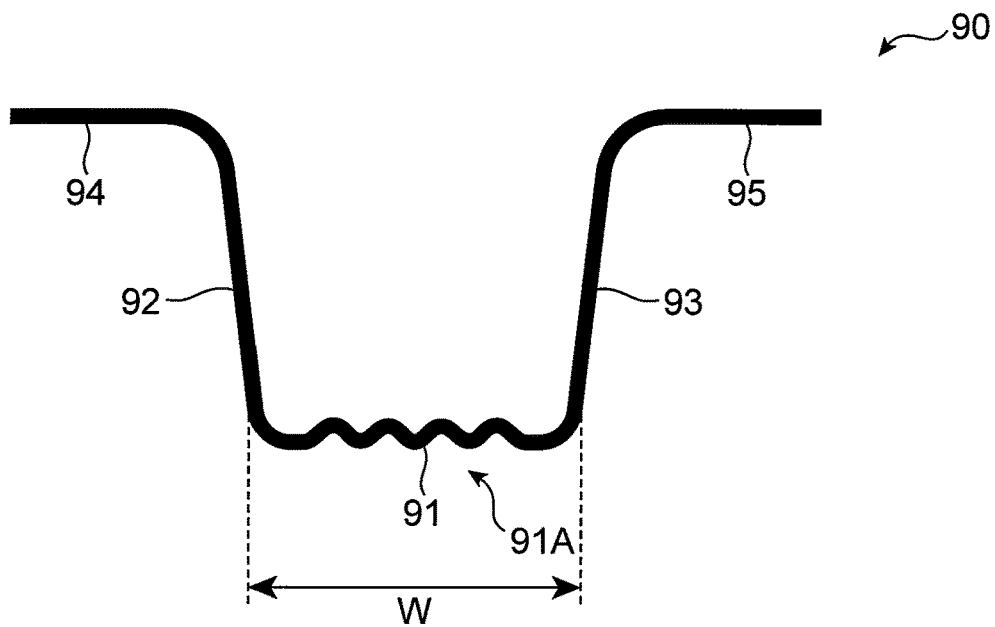
FIG. 11 is a diagram illustrating a press molded product.

As illustrated in FIG. 11, the press molded product 90 has a hat-like processed shape, and has a top plate portion 91 thickened by press molding the pressed portion 31, vertical wall portions 92 and 93 connected to both ends of the top plate portion 91, and flange portions 94 and 95 connected to end portions (end portions opposite to the side connected to the top plate portion 91) of the vertical wall portions 92 and 93. The vertical wall portions 92 and 93 and the flange portions 94 and 95 are portions corresponding to the peripheral portions 32 and 33 (FIG. 1), and are thinner than the top plate portion 91. That is, the press molded product 90 is partially thickened in the top plate portion 91. Furthermore, as illustrated in FIG. 11, the top plate portion 91 (thickened portion) has the uneven area 91A continuously formed to conform with the uneven surfaces of the press molding surfaces 10A and 20A of the first die 10 and the second die 20. The uneven area 91A is a wavy portion formed be repeatedly raised and lowered at a sufficiently small pitch with respect to a width W of the top plate portion 91 in the left and right direction in FIG. 11. With the uneven area 91A thus provided, the thickened portion 91 can have higher strength than that in a case of a flat surface shape.

[Operation and Effect]

Next, features as well as operations and effects of the press molding apparatus 1 and the method for manufacturing a press molded product according to the present embodiment will be described.

The press molding apparatus 1 is an apparatus that manufactures the press molded product 90 by press molding the bent pressed portion 31 having the plurality of corner portions 31G formed in the plate shaped pressed member 30. The press molding apparatus 1 has the first die 10 having the upper press molding surface 10A, the lower press molding surface 20A facing the upper press molding surface 10A so that the press space S in which the pressed portion 31 is accommodated is formed between the first die 10 and the second die 20, and the drive unit 40 that causes the first die 10 and the second die 20 to relatively move toward each other so that the press space S is reduced. The second die 20 is provided with the pair of concave groove shaped holding portions 20B that is provided while being spaced apart from each other and hold the two first bent portions 31A in the pressed portion 31. The first die 10 includes the pressing portion 14 that is positioned between the two holding portions 20B, has a shape protruding toward the second die 20, and presses the second bent portion 31B in the pressed portion 31.

The method for manufacturing a press molded product is a method for manufacturing the press molded product 90 by press molding the bent shaped pressed portion 31 having the plurality of corner portions 31G formed in the plate shaped pressed member 30. This manufacturing method includes step S09 for preparing the pressed member 30, step S10 for providing the pressed member 30, with the corner portions 31G formed in the pressed portion 31, between the first die 10 and the second die 20, and step S20 for causing the first die 10 and the second die 20 to relatively move toward each other to decrease the height H of the pressed portion and press mold the pressed portion 31.

In step S09 for preparing the pressed member 30, the flat plate-shaped pressed member 30 is prepared and processed so that the bent pressed portion 31 having the plurality of corner portions 31G is formed. Then, the pressed member 30 is softened by being heated in an electric furnace or by being energized and heated.

In step S10 in which the pressed member 30 is provided between the first die 10 and the second die 20, the pressed member 30, with the bent pressed portion 31 having the plurality of corner portions 31G, prepared in step S09 is provided between the first die 10 and the second die 20.

In step S20 in which the press molding is performed, the pair of first bent portions 31A that is bent to protrude toward the second die 20 is formed in the pressed portion 31 by means of the corner portions 31G. Then, the second bent portion 31B that is bent to protrude toward the first die 10 from the position between the pair of first bend portions 31A is formed in the pressed portion 31 by means of the corner portions 31G, while the pair of first bent portions 31A is being held by the pair of holding portions 20B that has a groove shape and is provided to be spaced apart from each other in the second die 20. Then, the second bent portion 31B is pressed by the pressing portion 14 of the first die 10 to be deformed, so that the pressed portion 31 is thickened.

With the above feature, the pressed portion 31 is formed in a bent shape with the line length required for thickening ensured. By press molding the pressed portion 31 to decrease the height H, the thickened portion can be formed. Therefore, compared with the comparative example illustrated in FIG. 2 in which the microbeads 310A are formed in the flat-plate shaped pressed portion 310, a longer line length, required for thickening, can be achieved, whereby the press molded product 90 with a larger thickened amount can be manufactured. Furthermore, during the press molding for the pressed portion 31, the second bent portion 31B provided between the first bent portions 31A being held by the holding portions 20B of the second die 20, is pressed by the pressing portion 14 of the first die 10. Thus, uneven distribution of the material on both sides or the center portion of the pressed portion 31 is suppressed. With the flow of the material during the press molding thus controlled, a desired thickening amount can be achieved, and local thinning that can result in a starting point of cracks in the press molded product 90 can be prevented. As a result, a press molded product having a desired shape can be appropriately obtained.

In the method for manufacturing a press molded product described above, the first bent portions 31A and the second bent portion 31B are formed in the pressed portion 31 in press molding step S20. More specifically, press molding step S20 includes bending step S21 and deforming step S22. In bending step S21, the first bent portions 31A and the second bent portion 31B are formed in the pressed portion 31 by means of the corner portions 31G. In deforming step S22, the second bent portion 31B is pressed and deformed while the first bent portions 31A are being held by the holding portions 20B. With the first and second bent portions 31A and 31B thus formed in the pressed portion 31 by means of the corner portions 31G during the press molding, the material flow is facilitated so that the first and second bent portions 31A and 31B can be easily formed at desired positions, whereby the press molded product with a desired shape can be more appropriately obtained. The first and second bent portions 31A and 31B need not to be formed in advance before press molding, and thus a more efficient manufacturing process can be achieved.

In press molding step S20 in the method for manufacturing a press molded product, the pressed portion 31 is press molded to have a larger thickness than the portion other than the pressed portion 31 (the peripheral portions 32 and 33) in the pressed member 30. Thus, the press molded product 90 having a partially thickened portion to have improved strength can be manufactured.

In press molding step S20 in the method for manufacturing a press molded product, the pressed portion 31 is press molded so that the height H of the pressed portion 31 disappears after the molding, that is, until the positions of the end portions of the peripheral portions 32 and 33 connected to the pressed portion 31 coincides with that of the pressed portion 31 in the vertical direction. As a result, the thickened amount of the pressed portion 31 can be more increased, whereby the press molded product 90 with more improved strength can be manufactured.

In the method for manufacturing a press molded product, the pressed member 30 has the peripheral portions 32 and 33 connected to the end portions of the pressed portion 31. In press molding step S20, the portions of the peripheral portions 32 and 33 connected to the pressed portion 31 are clamped by the first die 10 (first-die peripheral portions 12) and the second die 20 (second-die peripheral portions 22). Thus, the flow of the material from the end portions of the pressed portion 31 toward the center portion during the press molding can be facilitated, whereby uneven distribution with an excessive amount of material being in the end portions of the pressed portion 31 can be more effectively suppressed.

In the method for manufacturing a press molded product, the first die 10 includes the first-die center portion 11 having the pressing portion 14 and the first-die peripheral portions 12 that are formed separately from the first-die center portion 11 and are configured to be movable independently from the first-die center portion 11. In press molding step S20, the first bent portions 31A and the second bent portion 31B are formed in the pressed portion 31 by means of the corner portions 31G by moving the first-die peripheral portions 12, and then the second bent portion 31B is pressed by the pressing portion 14 to be deformed. More specifically, in bending step S21, the first bent portions 31A and the second bent portion 31B are formed in the pressed portion 31 by means of the corner portions 31G by moving the first-die peripheral portions 12 downward. In deforming step S22, the second bent portion 31B is pressed by the pressing portion 14 to be deformed by moving the first-die center portion 11 downward. Thus, the movement of the first-die center portion 11 can start after the second bent portion 31B is formed in the pressed portion 31 during the press molding, whereby the second bent portion 31B can be more reliably pressed by the pressing portion 14.

In the method for manufacturing a press molded product, the distance L1 between the pressing portion 14 and the second die 20 is the same as the distance L2 between the holding portion 20B and the first die 10, at the timing when press molding step S20 is completed. Thus, the pressed portion 31 can have a uniform thickness.

In press molding step S20 in the method for manufacturing a press molded product, the pressed portion 31 is provided with the uneven area 91A. Accordingly, the press molded product 90 that is reinforced by the uneven area 91A to have improved strength can be manufactured.

In the method for manufacturing a press molded product, the pressed member 30 is formed by hot pressing. As described above, in the present embodiment, the flow of the material in the pressed portion 31 can be controlled during press molding, whereby a desired thickened amount can be obtained even when hot pressing facilitating the material flow is performed.

(Another Embodiment)

In the above-described method for manufacturing a press molded product, the pressing portion 14 is provided in the first die 10. Alternatively, the pressing portion may be provided in the second die 20.

Figure 12:
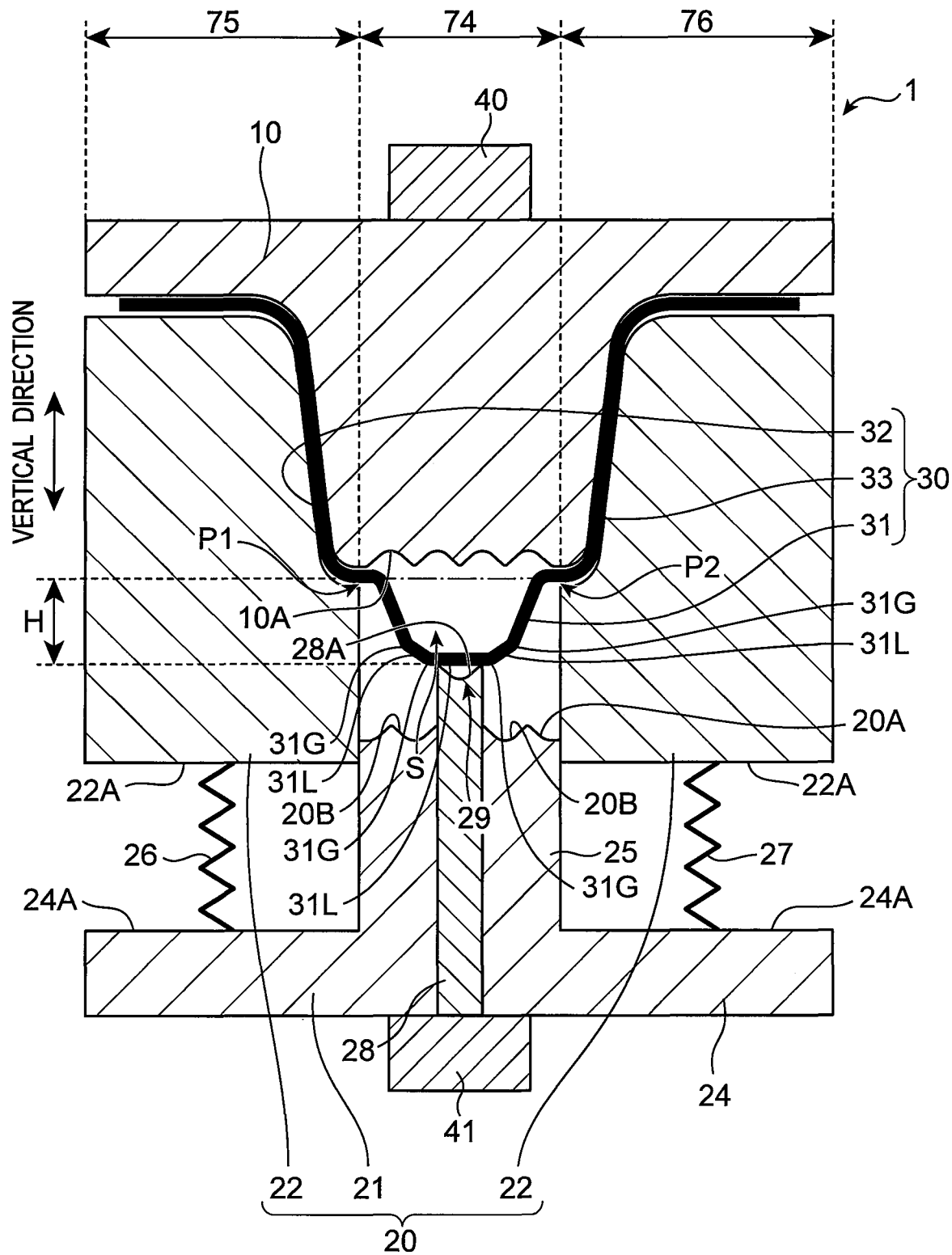
FIG. 12 is a diagram illustrating a configuration of a press molding apparatus used in a method for manufacturing a press molded product according to another embodiment.

FIG. 12 is a diagram illustrating a press molding apparatus used in a method for manufacturing a press molded product according to another embodiment of the present invention. The other embodiment is different from the above described embodiment in that the pressing portion is not provided in the first die 10 and a pressing portion 29 is provided in the second die 20. Other configurations are the same as those in the above embodiment. Thus, in the description of the other embodiment, parts that are the same as those in the above described embodiment are denoted with the same reference numerals and the detailed description on the content of these will be omitted.

As illustrated in FIG. 12, the second die 20 has the wavy lower press molding surface 20A that faces the upper press molding surface 10A of the first die 10. The second die 20 includes a second-die center portion 21 and second-die peripheral portions 22 formed separately from the second-die center portion 21.

The second-die center portion 21 includes the support portion 24 provided on a horizontal plane, the molding portion 25 standing upward toward the first die 10, at substantially the center of the support portion 24, and a molding center portion 28 arranged at the center of the molding portion 25. The molding center portion 28 is configured to be movable, by a drive unit 41, in the vertical direction.

Figure 13:
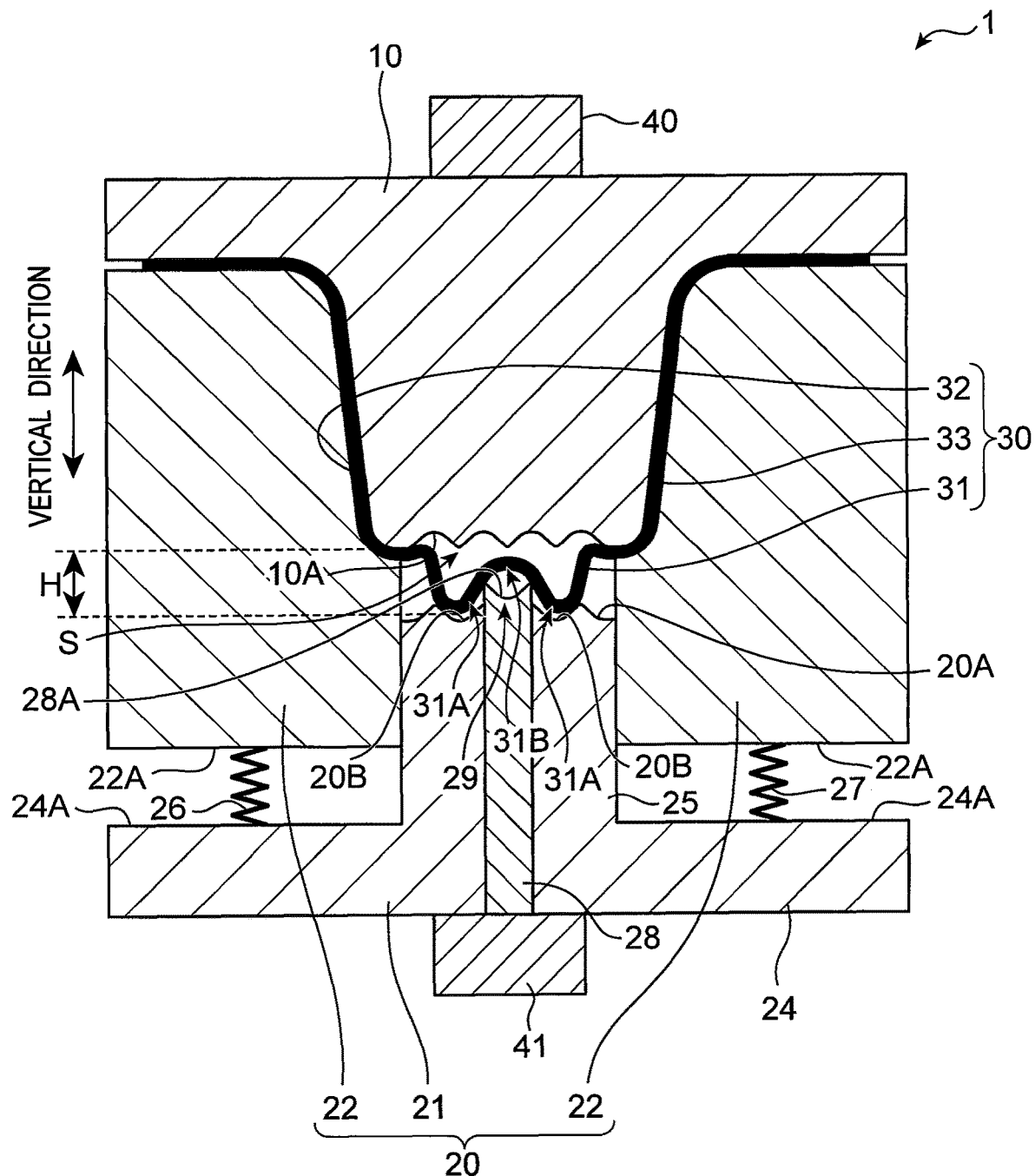
FIG. 13 is a diagram illustrating a state in which first and second bent portions are formed in a pressed portion of a pressed member, according to the other embodiment.

The pressing portion 29 having a shape recessed downward toward the first die 10 is provided on a mold surface 28A of the molding center portion 28. The pressing portion 29 is a center portion of the mold surface 28A and is recessed downward beyond the portions on both sides thereof. As illustrated in FIG. 13, during press molding, the second bent portion 31B is formed on the pressed portion 31. The second bent portion 31B is bent to protrude toward the first die 10, and can be pressed by the pressing portion 29 and the first die 10.

Figure 14:
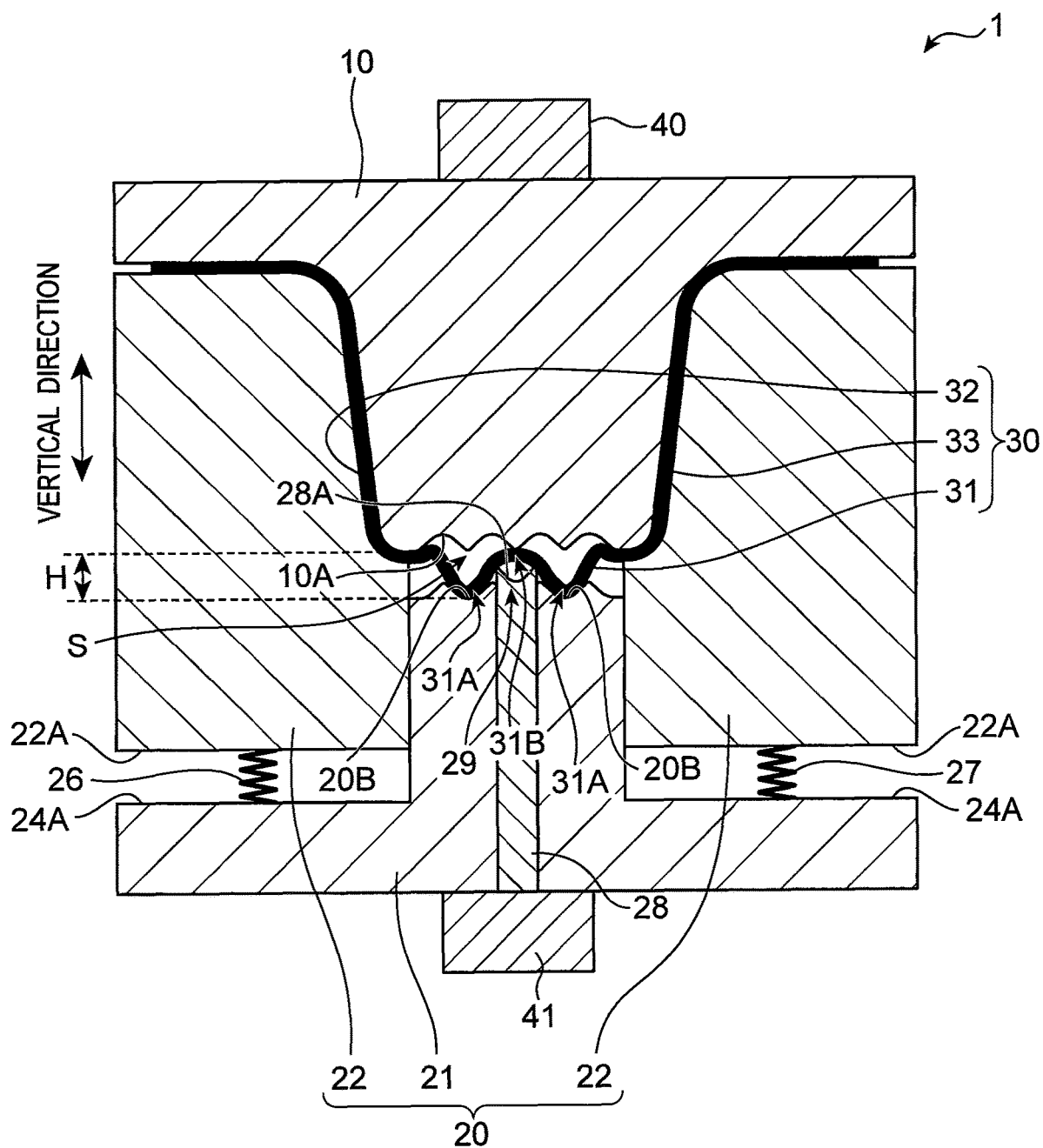
FIG. 14 is a diagram illustrating a state in which the second bent portion, formed in the pressed portion, is pressed by a pressing portion of a second die, according to the other embodiment.

Next, step S20 (FIG. 3) for press molding the pressed portion 31 will be described mainly with reference to FIGS. 12 to 15. FIGS. 12 to 15 sequentially illustrate processes of reducing the press space S and press molding the pressed portion 31 by lowering the first die 10 toward the second die 20. In step S20, the press space S is reduced by bringing the first die 10 closer to the second die 20, so that the pressed portion 31 is press molded to have the height H decreased. In this step S20, bending step S21 (FIG. 3) and deforming step S22 (FIG. 3) are performed in that order. In bending step S21, as illustrated in FIG. 13, the first bent portions 31A and the second bent portion 31B are formed in the pressed portion 31 by means of the corner portions 31G. In deforming step S22, as illustrated in FIG. 14, the second bent portion 31B is pressed and deformed while the first bent portions 31A are being held by the holding portions 20B.

First of all, in bending step S21, in the state illustrated in FIG. 12, the first die 10 is lowered toward the second-die peripheral portions 22 by the drive unit 40. Furthermore, the molding center portion 28 of the second die 20 is raised toward the first die 10 by the drive unit 41. As a result, the molding center portion 28 comes into contact with the pressed portion 31. Then, as illustrated in FIG. 13, the peripheral portions 32 and 33 are clamped and fixed between the first die 10 and the second-die peripheral portions 22. Thus, the flow of the material toward the peripheral portions 32 and 33 is prevented.

Then, as illustrated in FIG. 13, the press space S is reduced, and the height H of the pressed portion 31 is gradually decreased. When the height H of the pressed portion 31 decreases to or below a predetermined value, the pressed portion 31 is bent by means of the corner portions 31G, whereby the pair of first bent portions 31A that is bent to protrude toward the second die 20 and the second bent portion 31B that is bent to protrude toward the first die 10 from a position between the pair of first bent portions 31A are formed in the pressed portion 31. The expression "formed by means of the corner portions 31G" may indicate that the presence of the corner portions 31G results in bending at the corner portions 31G and bending at a portion between the corner portions 31G. In this process, as the first die 10 approaches the second die 20 with the peripheral portions 32 and 33 fixed, the material between the holding portions 20B and the peripheral portions 32 and 33 flows toward the holding portions 20B, and further flows from the holding portions 20B toward the pressing portion 14. As a result, the first bent portions 31A bulge to fit in the concave grooves of the holding portions 20B to have the position fixed, and the second bent portion 31B bulges upward to face the first die 10 by means of the molding center portion 28 of the second die 20.

Figure 15:
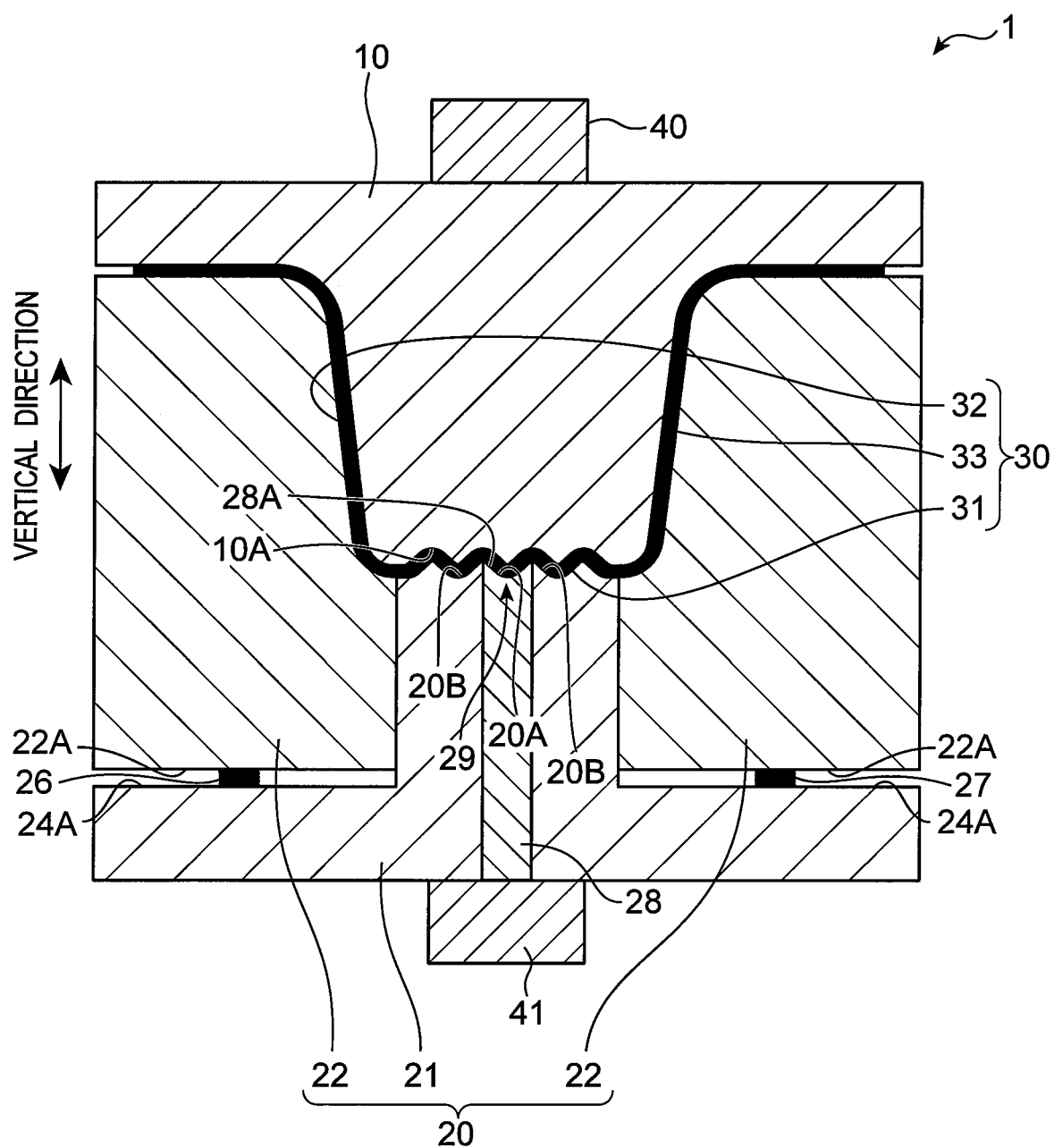
FIG. 15 is a diagram illustrating a state in which press molding for the pressed portion is completed, according to the other embodiment.

Next, in deforming step S22, the first die 10 is lowered by the drive unit 40, and the molding center portion 28 of the second die 20 is lowered by the drive unit 41 (here, the lowered amount of the molding center portion 28 is smaller than the lowered amount of the first die 10). The second bent portion 31B is pressed by the first die 10 and the pressing portion 29 of the molding center portion 28 of the second die 20, while the first bent portions 31A are being held by the holding portions 20B as illustrated in FIG. 14. As a result, the second bent portion 31B is deformed to be bent downward. In this process, the material flow in the pressed portion 31 occurs, but with the first bent portions 31A being held by the holding portions 20B, the outward flow of the material beyond the holding portions 20B (that is, toward the peripheral portions 32 and 33) is suppressed, whereby uneven distribution with an excessive amount of material being on both sides of the pressed portion 31 can be prevented. Furthermore, the end portions of the peripheral portions 32 and 33 connected to the pressed portion 31 are clamped between the first die 10 and the second-die peripheral portions 22, whereby the material is suppressed from flowing into the peripheral portions 32 and 33. Furthermore, in the center portion of the pressed portion 31, the second bent portion 31B is pressed by the pressing portion 29, thereby uneven distribution due to an excessive amount of material can be prevented. Then, as illustrated in FIG. 15, the movement of the first die 10 is stopped once the pressed portion 31 is lowered to a point when the height H disappears and the press molding is completed.

As described above, by press molding the pressed portion 31 in the height direction (that is, in the vertical direction) while preventing the material from flowing toward the peripheral portions 32 and 33, the pressed portion 31 is thickened in accordance with the decrease in the height H of the pressed portion 31. Thus, the pressed portion 31 has a thickness larger than thicknesses of the peripheral portions 32 and 33, whereby the press molded product that is partially thickened is manufactured. Furthermore, the pressed portion 31 after molding is not only thickened, but also has the uneven area having a shape conforming to the uneven surfaces of the upper and lower press molding surfaces 10A and 20A. When the press molding is thus completed, the first die 10 is raised by the drive unit 40, and then the press molded product is taken out.

In the other embodiment, the pressed portion 31 is formed in a bent shape with the line length required for thickening ensured. By press molding the pressed portion 31 to decrease the height H, the thickened portion can be formed. Therefore, compared with the comparative example illustrated in FIG. 2 in which the microbeads 310A are formed in the flat-plate shaped pressed portion 310, a longer line length, required for thickening, can be achieved, whereby the press molded product with a larger thickened amount can be manufactured. Furthermore, during the press molding of the pressed portion 31, the second bent portion 31B, provided between the first bent portions 31A being held by the holding portions 20B of the second die 20, is pressed by the pressing portion 29 of the second die 20. Thus, uneven distribution of the material on both sides or the center portion of the pressed portion 31 is suppressed. With the flow of the material during the press molding thus controlled, a desired thickening amount can be achieved, and local thinning that can result in a starting point of cracks in the press molded product 90 can be prevented. As a result, a press molded product having a desired shape can be appropriately obtained.

In press molding step S20 in the method for manufacturing a press molded product according to the other embodiment described above, the first bent portions 31A and the second bent portion 31B are formed in the pressed portion 31 by means of the corner portions 31G by moving the first die 10, and then the second bent portion 31B is pressed by the pressing portion 29 of the second die 20 to be deformed. More specifically, in bending step S21, the first bent portions 31A and the second bent portion 31B are formed in the pressed portion 31 by means of the corner portions 31G by moving the first die 10 downward and moving the molding center portion 28 of the second die 20 upward. In deforming step S22, the second bent portion 31B is pressed by the pressing portion 29 to be deformed by moving the first die 10 downward. Thus, the second bent portion 31B can be more easily formed by the pressing portion 29, and the second bent portion 31B can be more reliably pressed.

It should be understood that the embodiments disclosed herein are illustrative and non-restrictive. The scope of the present invention is defined by the scope of claims and not by the description above. The scope of the present invention is intended to include meaning equivalent to the terms of the claims as well as any modifications within the scope of claims.

The invention claimed is:

1. A method for manufacturing a press molded product by press molding a pressed portion that has a bent shape including a substantially horizontal linear portion and a pair of opposing substantially vertical portions extending from opposing ends of the linear portion such that the pressed portion has a height in the vertical direction, the pressed portion being formed in a pressed member having a plate shape, the method comprising:
    forming a plurality of corner portions in the pressed portion, the corner portions each comprising a bend and disposed between the substantially horizontal linear portion and each of the substantially vertical linear portions;
    providing the pressed member, having the corner portions formed in the pressed portion, between a first die and a second die; and
    press molding the pressed portion by relatively moving the first die and the second die toward each other to decrease the height of the pressed portion,
    wherein the press molding includes
    forming a pair of first bent portions in the pressed portion by bending at the corner portions, the pair of first bent portions being bent to protrude toward the second die,
    forming a second bent portion in the pressed portion by bending at a portion between the corner portions while holding the pair of first bent portions by a pair of holding portions spaced apart from each other and disposed in the second die, each holding portion having a groove shape, the second bent portion being bent to protrude toward the first die from a position between the pair of first bent portions, and
    pressing and deforming the second bent portion while holding the pair of first bent portions by the pair of holding portions, using a pressing portion of one of the first and second dies for bending the second bent portion such that the second bent portion protrudes toward the second die.

2. The method according to claim 1, wherein in the press molding, the pressed portion is thickened.

3. The method according to claim 1, wherein in the press molding, the pressed portion is press molded so that the pressed portion after being molded has a bent shape.

4. The method according to claim 1, wherein in the press molding, peripheral portions of the pressed portion in the pressed member are clamped by the first die and the second die.

5. The method according to claim 1, wherein the pressed member is formed by hot pressing.

* * * * *